Aug. 30, 1932.  S. RUMP  1,873,981
SYNCHRONIZING SYSTEM
Filed Dec. 3, 1930
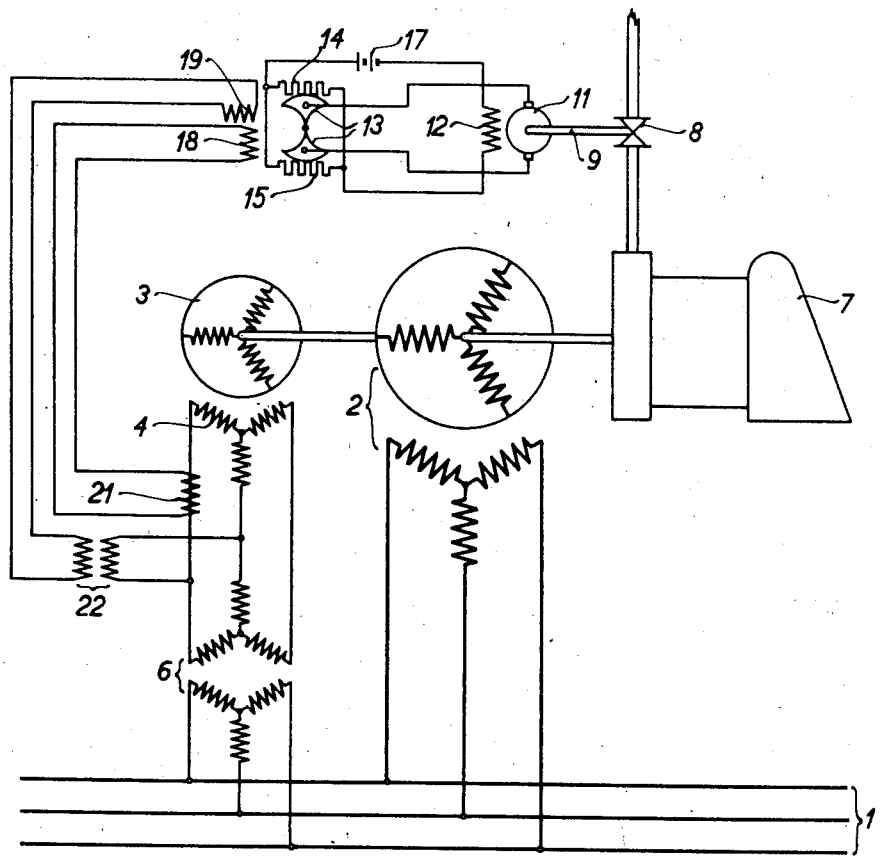
Inventor
Sigurd Rump
By
Attorney Patented Aug. 30, 1932

1,873,981

UNITED STATES PATENT OFFICE

SIGURD RUMP, OF ZURICH, SWITZERLAND

SYNCHRONIZING SYSTEM

Application filed December 3, 1930, Serial No. 499,628, and in Germany December 5, 1929.

This invention relates to an improved system for synchronizing or retaining electric current generators in synchronism.

The present invention provides a means for retaining electric current generators in synchronism when continuously connected to a common distribution line by regulation of the prime mover of all but one of the generators. Such result has been heretofore attained by the continuous connection of a synchronizing arrangement which was controlled jointly by the desired operating frequency of the line and a frequency corresponding to the speed of an auxiliary generator which was coupled with the generator to be synchronized. When the generators became asynchronous, the auxiliary generator varied in speed and its frequency varied relative to the line frequency. Such frequency differences operated a contact device such as a rotary synchronoscope, the torque of which was used to regulate the speed of the prime mover of the generator. Numerous disadvantages are apparent for such synchronizing systems.

It is, therefore, among the objects of the present invention to provide a system for retaining generators in synchronism in which system the prime mover operating one of the generators is regulated.

Another object of the invention is to provide a system for retaining generators in synchronism in which the auxiliary generator need not be provided with direct current excitation.

Another object of the invention is to provide a system for retaining generators in synchronism in which system the prime mover operating one of the generators is regulated by a relay connected between the line and the auxiliary generator.

Another object of the invention is to provide a system for retaining generators in synchronism in which system the prime mover operating one of the generators is regulated by a relay operated in dependence on the energy flow between the network and the auxiliary generator.

Objects and advantages, other than those above set forth, will be apparent from the following description when read in connection with the accompanying drawing which diagrammatically illustrates one embodiment of the present invention.

Referring more particularly to the drawing by characters of reference, the reference numeral 1 designates a portion of a distribution line supplied from a main generator 2. An auxiliary generator 3, 4 of the slipring induction type is driven by the shaft of generator 1. The stator winding 4 of the auxiliary generator is energized from a transformer 6 connected with line 1. Both of the generators are driven by a turbine or other suitable prime mover 7 to which the supply of the operating medium is controlled by a valve 8. The valve 8 is operated over a suitable drive 9 from a motor 11, 12. The terminals of the rotor 11 are connected with the movable contacts 13 of a regulator moving over the resistances 14, 15 connected in parallel and connected in series with field winding 12 of the motor which is connected with a source of current 17. Contacts 13 of the regulator is operated by the co-action of a current coil 18 and a voltage coil 19 connected through transformers 21 and 22 with the transformer 6 and stator 4 to impress a voltage on the rotor 11 of a magnitude and direction dependent on the position of contacts 13. The motor regulator is preferably returnable to its neutral position by a suitable spring (not shown).

As long as the speed and hence the frequency of the auxiliary generator 3, 4 corresponds to the line frequency, there is no energy flow between the auxiliary generator and the network and the regulator therefore does not operate. As soon, however, as a frequency difference appears, energy flows between transformer 6 and the auxiliary generator and the regulator operates thereby initiating rotation of the motor 11, 12 in either direction which adjusts valve 8 and hence regulates the speed of the turbine 2. As soon as the frequencies are again the same, the flow of energy from transformer 6 to generator 3, 4 ceases and the regulator is returned to the neutral position whereupon motor 11, 12 and valve 8 remain in the position which they have reached. The sensitivity of the regulator is increased by keeping the no-load losses of the auxiliary generator small and by making its output, at a given slip frequency, as large as is possible.

Although but one embodiment of the present invention has been illustrated and described, it will be apparent to those skilled in the art that various changes and modifications may be made therein without departing from the spirit of the invention or from the scope of the appended claims.

The invention claimed is:

1. In a system for retaining generators in synchronism, a main generator, an auxiliary generator having a rotor and a stator winding, the stator winding of said auxiliary generator being connected with said main generator, a prime mover operating said generators, and means connected with and operated by energy flow in the stator winding of said auxiliary generator to control the speed of said prime mover.

2. In a system for retaining generators in synchronism, a main generator, an auxiliary generator having a rotor and a stator winding, the stator winding of said auxiliary generator being connected with said main generator, a prime mover operating said generators, and a regulator operating in dependence on the direction of energy flow in the stator winding of said auxiliary generator to control the speed of said prime mover.

3. In a system for retaining generators in synchronism, a main generator, an auxiliary generator having a rotor and a stator winding, the stator winding of said auxiliary generator being connected with said main generator, a prime mover operating said generators, a motor controlling the supply of operating medium to said prime mover, and a regulator operating in dependence on the direction of energy flow in the stator windings of said auxiliary generator to control the operation of said motor.

4. In a system for retaining generators in synchronism, a main generator, an auxiliary generator having a rotor and a stator winding, the stator winding of said auxiliary generator being connected with said main generator, a prime mover operating said generators, a motor operable in either direction for controlling the supply of operating medium to said prime mover, and a regulator operating in dependence on the direction of energy flow in the stator winding of said auxiliary generator to control the operation of said motor in either direction of rotation.

5. In a system for retaining generators in synchronism, an alternating current line, a generator connected with and supplying current to said line, an auxiliary generator, a transformer connecting the output circuit terminals of said auxiliary generator with said line, a prime mover driving said generators, and means connected between said terminals and said line operative to control the speed of said prime mover in response to the direction of energy flow between said auxiliary generator and said transformer.

6. In a system for retaining generators in synchronism, an alternating current line, a generator connected with and supplying current to said line, an auxiliary generator, a transformer connecting the output circuit terminals of said auxiliary generator with said line, a prime mover driving said generators, a regulator having a plurality of operating coils, said regulator controlling the speed of said prime mover, and means connecting the coils of said regulator with said terminals and with said transformer to cause operation of said regulator in response to the direction of energy flow between said auxiliary generator and said transformer.

7. In a system for retaining generators in synchronism an alternating current line, a generator connected with and supplying current to said line, an auxiliary generator, a transformer connecting the output circuit terminals of said auxiliary generator with said line, a prime mover driving said generators, a regulator having a current coil and a voltage coil, said regulator controlling the speed of said prime mover, a current transformer connected with the said current coil and between said terminals and the first said transformer, and a voltage transformer connected with the voltage coil and between said terminals and the first said transformer.

In testimony whereof I have hereunto subscribed my name this 19th day of November A. D. 1930.

SIGURD RUMP.